(12) United States Patent
Cazals et al.

(10) Patent No.: US 9,051,042 B2
(45) Date of Patent: Jun. 9, 2015

(54) AIRCRAFT WITH A PIVOTABLE REAR PORTION

(75) Inventors: Olivier Cazals, Daux (FR); Jaime Genty de la Sagne, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 13/477,270

(22) Filed: May 22, 2012

(65) Prior Publication Data

US 2012/0298795 A1 Nov. 29, 2012

(30) Foreign Application Priority Data

May 23, 2011 (FR) ...................................... 11 54482

(51) Int. Cl.
*B64C 5/02* (2006.01)
*B64C 1/26* (2006.01)
*B64C 9/32* (2006.01)

(52) U.S. Cl.
CPC ... *B64C 5/02* (2013.01); *B64C 1/26* (2013.01); *B64C 9/32* (2013.01); *Y02T 50/44* (2013.01)

(58) Field of Classification Search
USPC .................... 244/87, 88, 45 R, 46, 48, 49, 30
See application file for complete search history.

(56) References Cited

U.S. PATENT DOCUMENTS

| | | | |
|---|---|---|---|
| 2,376,780 A | 5/1945 | Kenyon | |
| 3,002,719 A * | 10/1961 | Weiland et al. | ............ 244/118.1 |
| 3,054,579 A | 9/1962 | Bary | |
| 3,240,488 A * | 3/1966 | Schaffer | .......................... 244/87 |
| 3,966,142 A * | 6/1976 | Corbett et al. | ................ 244/12.4 |
| 4,085,911 A * | 4/1978 | Nahodyl | ........................ 244/12.4 |
| 8,342,446 B2 * | 1/2013 | Chareyre et al. | ................. 244/87 |
| 2004/0089765 A1 | 5/2004 | Levy | |
| 2007/0267541 A1 * | 11/2007 | Honorato Ruiz et al. | ........ 244/87 |
| 2010/0133377 A1 | 6/2010 | Cazals et al. | |
| 2010/0148000 A1 * | 6/2010 | Llamas Sandin et al. | ....... 244/87 |
| 2010/0163669 A1 * | 7/2010 | Im | ................................... 244/36 |

FOREIGN PATENT DOCUMENTS

FR 2 937 302 4/2010

OTHER PUBLICATIONS

French Preliminary Search Report issued Jan. 20, 2012, in French 1154482, filed May 23, 2011 (with English Translation of Categories of Cited Documents).

* cited by examiner

*Primary Examiner* — Brian M O'Hara
*Assistant Examiner* — Jessica Wong
(74) *Attorney, Agent, or Firm* — Oblon, McClelland, Maier & Neustadt, L.L.P.

(57) ABSTRACT

An aircraft including a fuselage which extends along a longitudinal axis. The fuselage includes a substantially cylindrical central portion and a rear portion that may have a flattened or conventional shape. This rear portion which comprises the rear end of the fuselage includes a support surface which bears at least one horizontal stabilizer and/or vertical stabilizer. The rear portion is able to pivot in relation to the central portion around an axis such as the pitch axis, at least one stabilizer or the support surface being equipped with at least one control surface.

11 Claims, 4 Drawing Sheets

AIRCRAFT WITH A PIVOTABLE REAR PORTION

CROSS REFERENCE TO RELATED APPLICATIONS

The present application claims foreign priority to French patent application number FR1154482 filed May 23, 2011.

BACKGROUND OF THE INVENTION

The invention relates to an aircraft, more particularly to the rear portion of such an aircraft.

In general, an aircraft, in particular a commercial aircraft, comprises a more or less elongated cylindrical fuselage to which one or more stabilizers are fastened in a rear portion. These stabilizers comprise various aerodynamic surfaces in order to ensure the stability of the airplane and to impart thereto a greater maneuverability by means of the control surfaces associated with the stabilizers.

In order to limit the drag at the rear end of the airplane, the rear portion of the fuselage is tapered, its section decreasing in height and in width from the section of the central portion of the fuselage so as to form a point.

On this end there is fastened a stabilizer assembly, usually comprising a vertical stabilizer and a horizontal stabilizer made up of two aerodynamic surfaces symmetrical in relation to the fuselage.

This type of stabilizer assembly, however, has drawbacks, in particular that of presenting a considerable wetted area. Furthermore, the installation of aerodynamic surfaces on an end with reduced surface and volume is not only complex because of the need for installation of systems such as the control-surface controls, but also disadvantageous with regard to stresses to be taken up by the fuselage.

BRIEF SUMMARY OF THE INVENTION

In order to remedy at least one of the aforementioned drawbacks, the invention has as an object an aircraft comprising a fuselage extending along a longitudinal axis, the said fuselage comprising a central portion and a rear portion including at least one support surface bearing at least one stabilizer, the said support surface being able to pivot in relation to the central portion around at least one axis of the aircraft, the said at least one axis including the pitch axis, at least one stabilizer or the support surface being equipped with at least one control surface.

The fact of being able to pivot the stabilizer makes it possible to ensure the trim function ("TRIM" function in English terminology).

In this way it is possible to consider stabilizer configurations that lead to a reduction of the wetted area.

The presence of at least one control surface on the support surface or at least one of the stabilizers makes it possible to ensure a better maneuverability for the aircraft.

More particularly, the said at least one control surface is of spoiler type ("spoiler" in English terminology). Other types of control surfaces also may be considered.

According to a possible characteristic of the invention, the rear portion includes a fixed portion and a movable portion including the support surface.

According to one characteristic, the support surface is integral with a pivoting base section the normal of which, in a cruising position, is merged with the longitudinal axis of the fuselage, and in a different position, forms a positive or negative angle with this axis.

The fact of being able to position the support surface in a high (positive angle) or low (negative angle) position in relation to the rest of the fuselage makes it possible to achieve a better effectiveness and a better adaptability to the flight conditions.

According to a possible characteristic, the support surface bears both a horizontal stabilizer and a vertical stabilizer.

According to a possible characteristic, the vertical stabilizer includes two aerodynamic surfaces situated at the respective opposite ends of the horizontal stabilizer so that the assembly formed by the support surface and the stabilizers is U-shaped.

Such an arrangement makes it possible in particular to approximate a V-shaped stabilizer structure known for its advantages in terms of reduction of the wetted area. Other stabilizer configurations, such as an H-shaped or T-shaped stabilizer, also may be considered.

In a specific embodiment, the horizontal stabilizer includes two aerodynamic surfaces forming a non-zero angle in relation to the horizontal position.

This configuration makes it possible to approximate a V configuration even more closely.

In an alternative embodiment, the aircraft comprises a vertical stabilizer fastened to the central portion of the fuselage.

According to one characteristic, the horizontal stabilizer has a positive sweep.

Alternatively, the horizontal stabilizer has a negative sweep. An inverse sweep makes it possible in particular to decrease the moment arm of the horizontal stabilizer in relation to the pivot axis (when the latter is the pitch axis). This decrease of the stresses on the fuselage makes it possible, as a result, to reduce the weight of the rear portion and of the pivot systems.

According to a possible characteristic, the support surface pivots with the aid of at least one system jointed around a pivot axis, the pivoting motion being induced by activation means.

According to a possible characteristic, the activation means are one or more linear actuators and, for example, jacks.

Such a system is advantageous because of its simplicity and its ease of use. The actuator may be activated electrically, for example.

In order to make the mechanism more secure, the support surface pivots with the aid of at least two systems jointed around a pivot axis activated by at least one actuator.

According to a specific embodiment, the central portion of the fuselage is more or less cylindrical and the section of the rear portion, starting from a section for connection with the central portion, is diminishing in height so that the support surface has a thickness that decreases gradually up to its trailing edge, thus imparting a more or less horizontal flattened shape to the support surface.

The flattened shape of the support surface or bearing surface makes it possible to provide a better continuity of the aerodynamic shapes and of the effectiveness of the trim (TRIM) function with the horizontal stabilizer. This makes it possible to simplify the structural design of the rear portion of the fuselage and to reduce the aerodynamic disadvantages as compared to a conventional solution. This brings about in particular a decrease of the total weight of the rear portion and a reduction in production costs. A fuselage-end flattened shape is known in particular from FR2937302.

Other characteristics and advantages will become apparent in the course of the description that is going to follow, provided by way of non-limitative example and presented with reference to the attached drawings, on which:

DETAILED DESCRIPTION OF THE INVENTION

Figure 1:
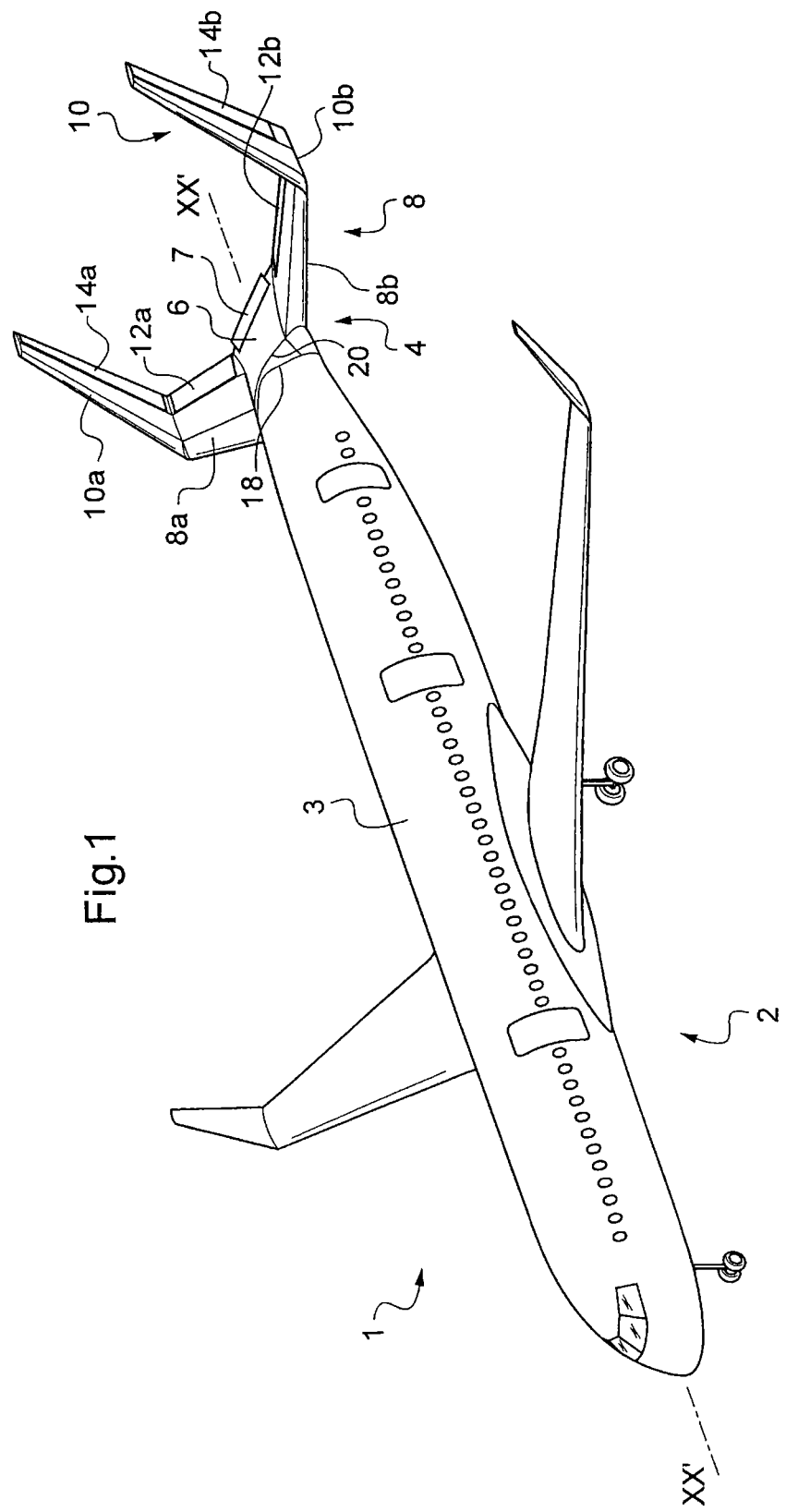
FIG. 1 is a schematic view in perspective of an aircraft according to the invention.

The aircraft, more particularly airplane 1 illustrated on FIG. 1, comprises a fuselage 2 divided into a central portion 3 and a rear portion 4 including the end of the fuselage.

Rear portion 4 comprises a fixed portion and a movable portion. The movable portion includes in particular a support surface 6 integral with a pivot base section distinguishing the fixed portion from the movable portion and which will be described farther on.

The movable portion of this rear portion 4 comprises in particular a support surface 6 or bearing surface on which at least one horizontal stabilizer 8 is fastened. Support surface 6 is equipped with two elevators 7, one on the lower surface and one on the upper surface, preferably of spoiler ("spoiler" in English terminology) type. The simultaneous deflection of the two lower-surface and upper-surface control surfaces makes it possible to achieve an air brake effect. It also is possible to provide only one elevator at the trailing edge of portion 6. Rear portion 4 here is of flattened shape in order to provide a better continuity of the aerodynamic shapes with horizontal stabilizer 8. It diminishes in height so that support surface 6 has a thickness that decreases gradually up to its trailing edge, thus imparting a more or less horizontal flattened shape to support surface 6. However, a standard rear portion, that is to say in the shape of a truncated cone, also may be considered.

Figure 2:
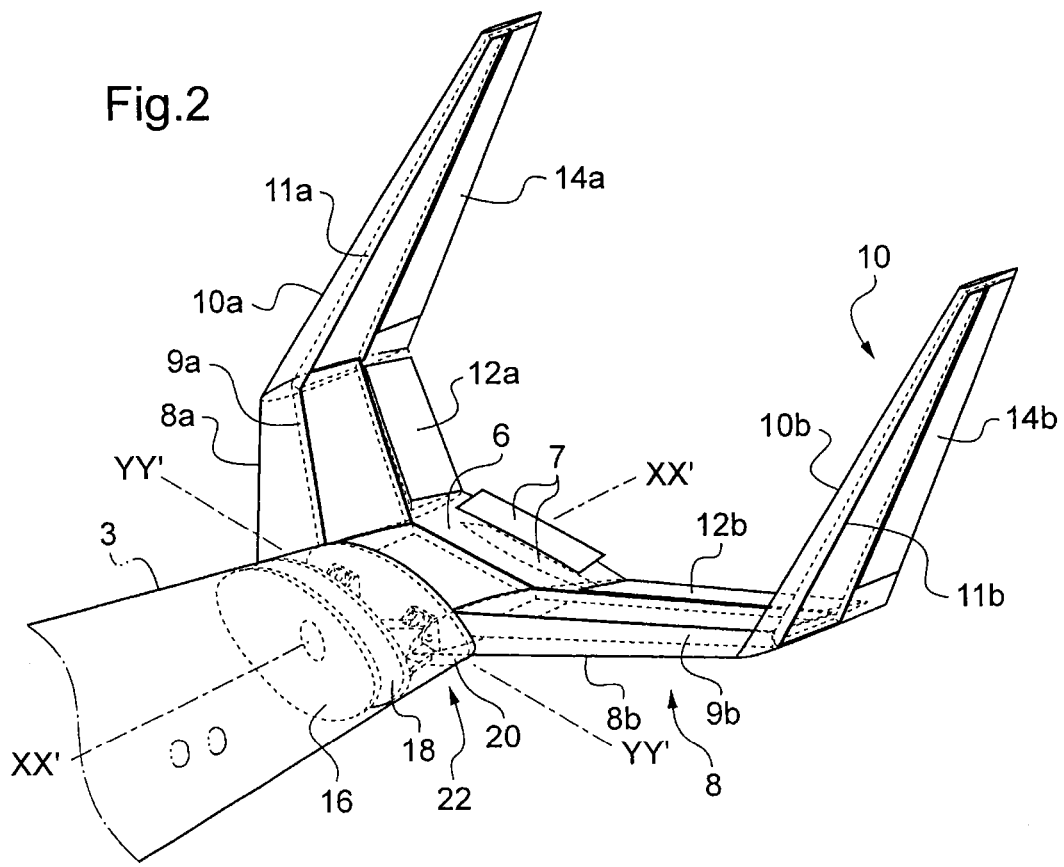
FIG. 2 is a schematic view in perspective of the rear end of the aircraft of FIG. 1.

In the embodiment presented on FIG. 1 and in greater detail on FIG. 2, horizontal stabilizer 8 is made up of two aerodynamic surfaces 8a and 8b symmetrical in relation to fuselage 2, with or without dihedral, in other words being able to form a non-zero angle in relation to the pitch axis (this axis corresponds to the horizontal when the aircraft is on the ground).

Bearing surface 6 also bears a vertical stabilizer 10.

In the embodiment illustrated on FIG. 1, this vertical stabilizer 10 is borne by bearing surface 6 by means of horizontal stabilizer 8.

Vertical stabilizer 10 actually is made up of two vertical aerodynamic surfaces 10a and 10b which each are connected respectively to horizontal aerodynamic surfaces 8a and 8b (at the opposite ends thereof) by longeron-rib assemblies 9a-b and 11a-b. Other configurations, such as a T-shaped or H-shaped stabilizer assembly, however, may be considered.

Horizontal aerodynamic surfaces 8a and 8b, as well as vertical aerodynamic surfaces 10a and 10b are equipped with control surfaces 12a, 12b and 14a, 14b respectively. In other embodiments, the aerodynamic surfaces may comprise more than one control surface, or not be equipped with any.

FIG. 2 illustrates in greater detail rear portion 4, and in particular impervious partition 16 ("bulkhead" in English terminology), which separates central portion 3 of the fuselage from its rear portion 4. Bulkhead 16 follows the shape of the section of the fuselage and is slightly curved along the axis X-X'. It is starting from this bulkhead that fuselage 2 takes on a gradually flattened shape. Other bulkhead shapes also may be considered. In the embodiment presented here, bearing surface 6 is able to pivot in relation to central portion 3 around an axis Y-Y' (pitch axis) perpendicular to the longitudinal axis X-X' and contained within the plane of bearing surface 6. Pivot means 22 are provided for making it pivot.

These means are included between two main ribs 18 and 20 positioned behind bulkhead 16. The ribs follow the shape of the section of fuselage 2 and are more or less plane. They are spaced apart sufficiently to accommodate pivot means 22, illustrated in greater detail on FIG. 3, between their respective surfaces.

Main rib 18 of the rear portion is fixed. Main rib 20, on which bearing surface 6 is mounted, is itself movable. Main rib 20 therefore constitutes a pivot base section of bearing surface 6. The association of these two elements and of those which they support constitutes the movable portion of rear portion 4.

Means 22 include two jointed mechanisms each comprising a pivot-type joint so that the entire rear portion swings. Swinging may be implemented in another manner, however, with the aid of a jointed arm, sliders or other mechanisms. More particularly, according to the embodiment presented on FIG. 2, each mechanism includes two parts jointed in relation to one another around a common pivot axis 28a, 28b (FIG. 3) perpendicular to the axis X-X'.

Each part is provided, at its free end which is opposite the free end of the other part, with nesting elements that fit into one another and are mounted rotatively around common axis 28a or 28b depending on the mechanism concerned.

Figure 3:
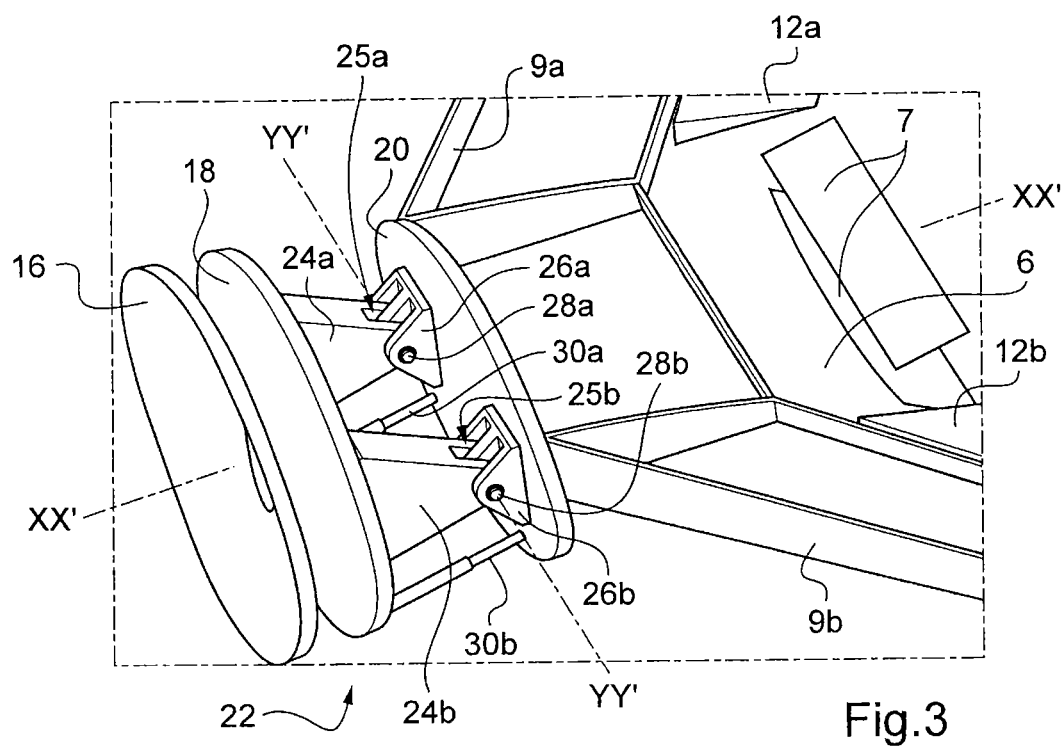
FIG. 3 is an enlargement of a detail of FIG. 2, the fuselage being concealed.

With reference to FIG. 3, the pivot means include two pairs of ferrules 24a, 26a and 24b, 26b linked respectively inside the same pair by respective axes 28a and 28b. By pair of ferrules there is understood here reinforcement elements which between them connect two parts movable with regard to one another according to a jointing motion. These two elements form a hinge. Despite their designation, these ferrules may be produced in a material other than metal, in particular in a composite material.

With a view to making the mechanism more secure (making it "fail-safe" in English terminology), these ferrules here are doubled in unitary manner. In another embodiment not shown, there may be only one pair of ferrules 24a, 26a which, for example, is arranged instead in the median zone of main ribs 18 and 20 so as to ensure making the mechanism fail-safe.

Ferrules 24a, 24b are fastened in known manner by one of their ends to the inner surface of upstream rib 18 which is opposite the inner surface of downstream rib 20. In the embodiment presented on FIG. 3, the base of the ferrules is rectangular and their shape is elongated triangular (in side view) toward rib 20. Other shapes, such as semicircular or rectangular shapes in side view also may be considered.

These ferrules are mechanical parts serving as support for rib 20. Ferrules 24a, 24b each comprise in their mass, at their respective free end, a slot or jaw 25a, 25b which is situated in the vicinity of rib 20 and into which the corresponding ferrule is inserted respectively opposite 26a, 26b.

Fixed ferrules 26a, 26b are fastened to the inner face of movable rib 20 which is opposite rib 18. In FIG. 3, their base is rectangular and their elongated triangular shape (in side view) along the axis X-X' extends so as to form a fork with three branches in the direction of ferrules 24a, 24b and rib 18. The three branches are spaced apart from each other along the direction indicated by the axis Y-Y'. They are three in number in order to make the mechanism fail-safe.

The branch in the middle is inserted into jaw 25a, 25b, opposite ferrule 24a, 24b, the two other branches extending on both sides of ferrule 24a, 24b of each jaw, thus surrounding same.

Each of the branches has a through-hole made in its thickness allowing the passage of an axis 28a, 28b serving for rotation of ferrules 26a, 26b in relation to ferrules 24a, 24b which remain fixed. The axis Y-Y' therefore passes through axes 28a, 28b. Jaw 25a, 25b of each ferrule 24a, 24b also may have a through-hole made therein (in each jaw portion) which, in the arrangement of FIG. 3, is aligned with the holes in the branches.

The pivoting of rear portion 4 is implemented with the aid of one or more actuators, for example linear or rotary. Actuators 30a-30b are fastened at their opposite ends to the inner surfaces of ribs 18 and 20 respectively. Like the ferrules, the latter are one or more in number so as to make the mechanism fail-safe. Even with only one pair of ferrules, two actuators may be used in order to balance the transmission of stress and to stabilize the pivoting motion.

Figure 4:
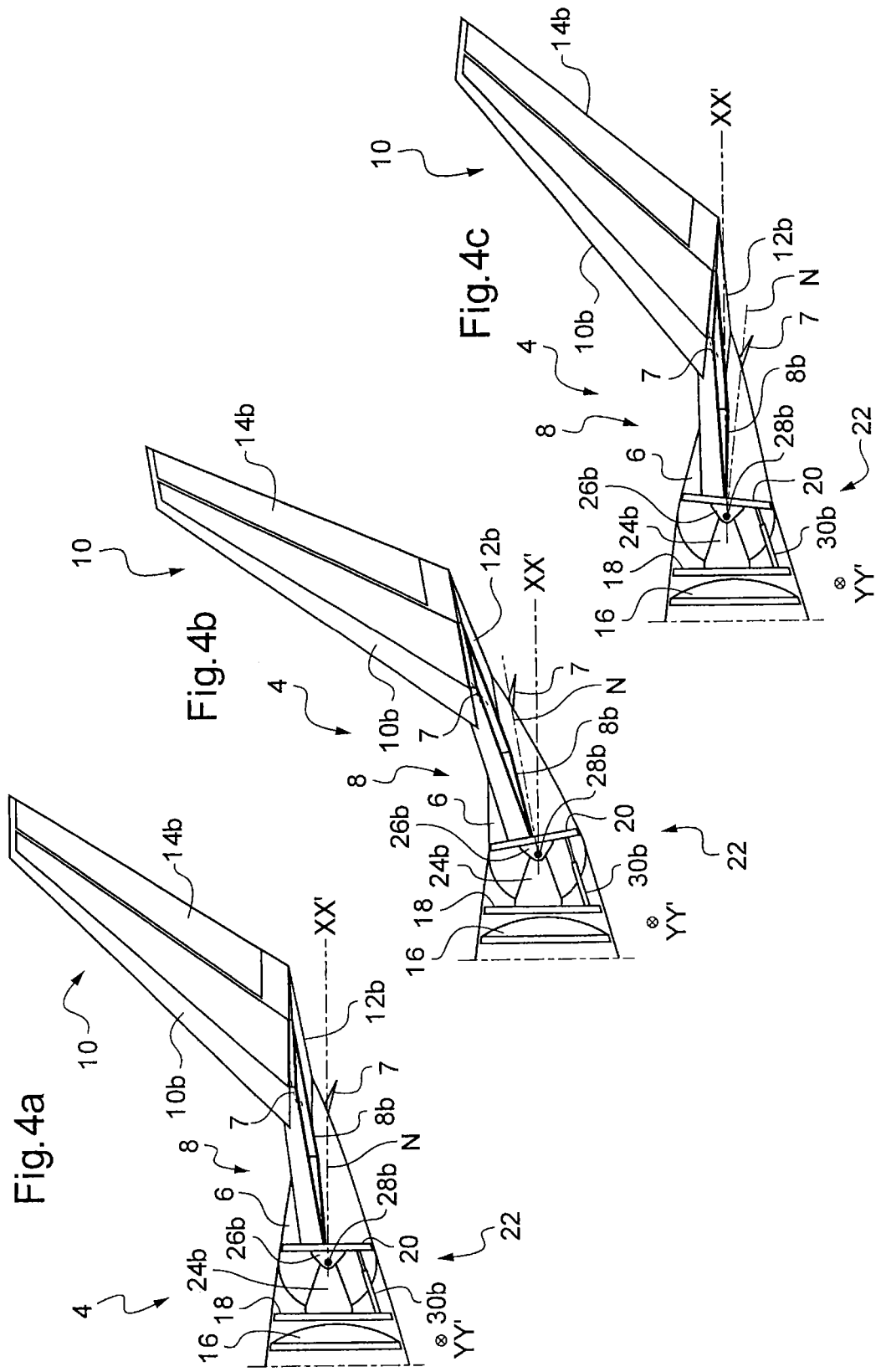
FIG. 4a is a schematic side view of the aircraft of FIG. 1 in which the rear portion is in cruising position.
FIG. 4b is a schematic side view of the aircraft of FIG. 1 in which the rear portion is in raised position.
FIG. 4c is a schematic side view of the aircraft of FIG. 1 in which the rear portion is in lowered position.

FIGS. 4a, 4b and 4c illustrate the different positions that the movable portion of rear portion 4, in particular bearing surface 6, may assume in relation to the rest of fuselage 3.

FIG. 4a illustrates a position referred to as cruising in which the longitudinal axis of rear portion 4 and the normal N of rib 20 (pivot base section) are merged.

FIG. 4b illustrates a position of rear portion 4 referred to as "high". In this position, the angle between the normal N and the axis X-X' is positive. This high position is achieved by pivoting from the cruising position (FIG. 4a) by virtue of actuators 30a, 30b, in extension position (actuators deployed).

Conversely, FIG. 4c illustrates a position of bearing surface 6 referred to as "low," where the angle between the normal N and the axis X-X' is negative.

The aircraft is provided in particular with a system (not shown) making it possible to control, through the use of the actuator or actuators (for example jacks) 30a, 30b, the pivoting of bearing surface 6 according to the flight conditions of the aircraft.

Figure 5:
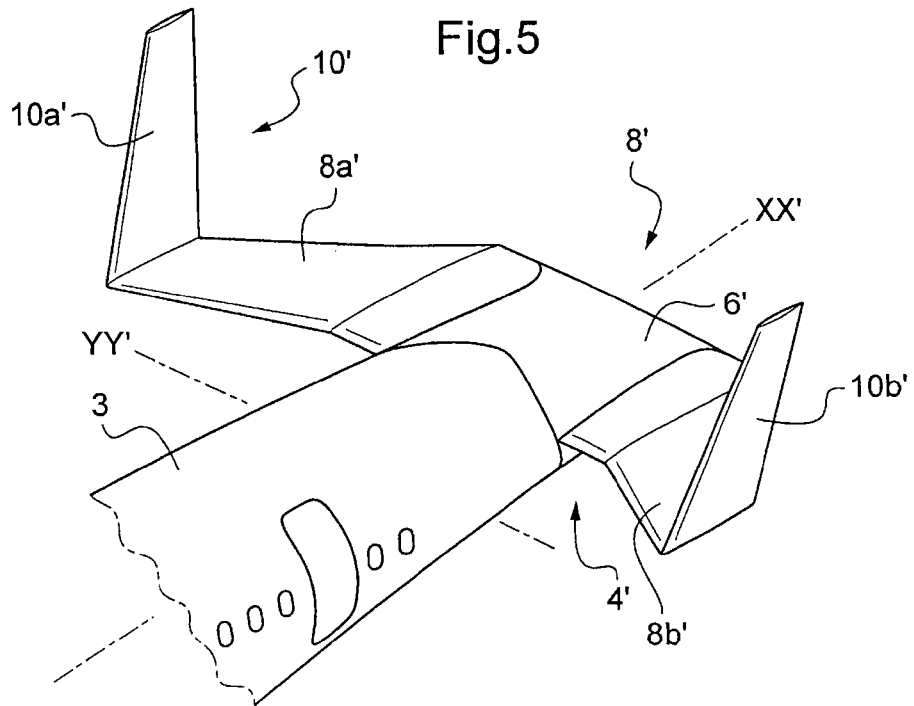
FIG. 5 is a partial schematic view in perspective showing the rear portion of an aircraft according to the invention equipped with a horizontal stabilizer with inverse sweep.

In an alternative embodiment presented on FIG. 5, the sweep of horizontal stabilizer 8' is negative, aerodynamic surfaces 8a' and 8b' of the horizontal stabilizer (horizontal aerodynamic surfaces) thus forming an acute angle with the axis of the fuselage X-X'. As regards vertical aerodynamic surfaces 10a' and 10b' of vertical stabilizer 10', they remain fastened to the ends of aerodynamic surfaces 8a' and 8b'. Likewise, support surface 6' remains unchanged in comparison with the embodiment of FIGS. 1 to 4.

This embodiment has the advantage of decreasing the moment arm of horizontal stabilizer 8' in relation to the axis of rotation Y-Y' and therefore of decreasing the stresses sustained. In this way, it is possible to decrease the weight of horizontal stabilizer 8'.

The elements of FIGS. 6 to 11 in common with those of FIG. 5 retain the same references and will not be described again.

Figure 6:
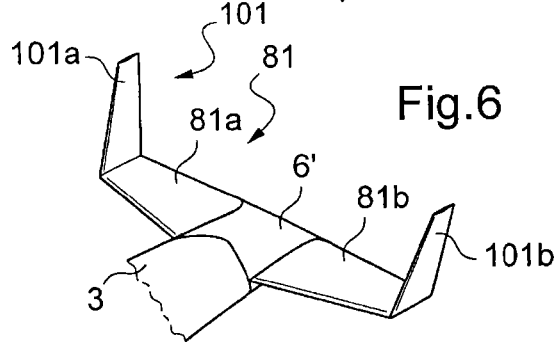
FIGS. 6 to 11 are partial schematic views in perspective showing the rear portion of an aircraft according to different embodiments of the invention.

In a third embodiment presented on FIG. 6, the sweep of horizontal stabilizer 81 is positive, aerodynamic surfaces 81a and 81b forming an obtuse angle with the axis X-X'. Vertical aerodynamic surfaces 101a and 101b of horizontal stabilizer 101 remain fastened to the ends of aerodynamic surfaces 81a and 81b.

In a fourth embodiment not shown, the shape of fuselage 2 is identical to that of an aircraft of the prior art: rear portion 4 has the shape of a truncated cone but retains the possibility of pivoting around an axis such as the axis Y-Y'.

In a fifth embodiment not shown, vertical stabilizer 10 no longer is situated on horizontal stabilizer 8 but on central portion 3 of the fuselage. The rest of the elements of the rear portion of the aircraft retain the configuration presented on FIGS. 1 to 4.

In a sixth embodiment not shown, vertical stabilizer 10 is situated on central portion 3 of the fuselage, rear portion 4 has the shape of a truncated cone and is able to pivot around an axis such as the axis Y-Y'.

In the following embodiments, with the exception of the one presented in FIG. 11, the horizontal stabilizer has a configuration identical to that of FIG. 6.

Figure 7:
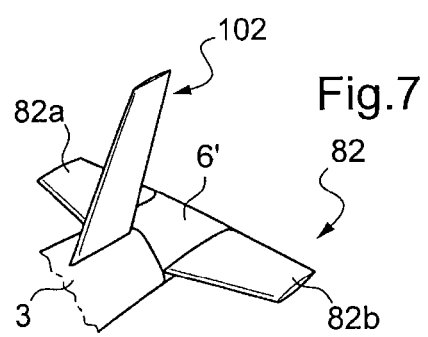

In a seventh embodiment shown on FIG. 7, vertical stabilizer 102 consisting of only one aerodynamic surface is situated on fuselage 3 close to bearing surface 6' consisting of two horizontal aerodynamic surfaces 82a and 82b and no longer on vertical stabilizer 82.

Figure 8:
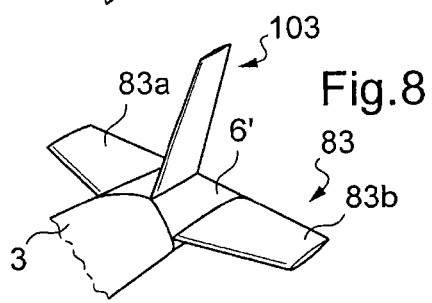

In an eighth embodiment shown on FIG. 8, vertical stabilizer 103, consisting of only one aerodynamic surface, is situated on bearing surface 6'. As regards horizontal stabilizer 83, it consists of two horizontal aerodynamic surfaces 83a and 83b.

Figure 9:
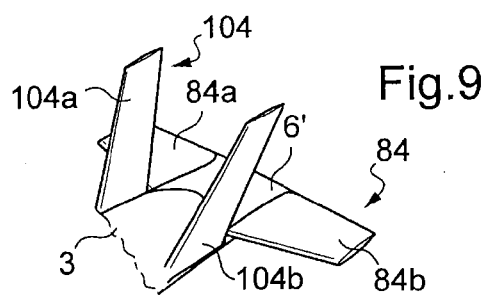

In a ninth embodiment shown on FIG. 9, vertical stabilizer 104, consisting of two vertical surfaces 104a and 104b, is situated on central portion 3 of the fuselage close to support surface 6'. As regards horizontal stabilizer 84, it consists of two horizontal aerodynamic surfaces 84a and 84b.

Figure 10:
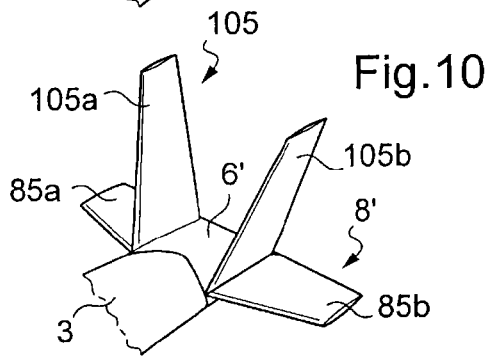

In a tenth embodiment shown on FIG. 10, vertical stabilizer 105, consisting of two vertical surfaces 105a and 105b, is situated on support surface 6' at the connection of horizontal stabilizer 85 consisting of two horizontal aerodynamic surfaces 85a and 85b, to support surface 6'.

Figure 11:
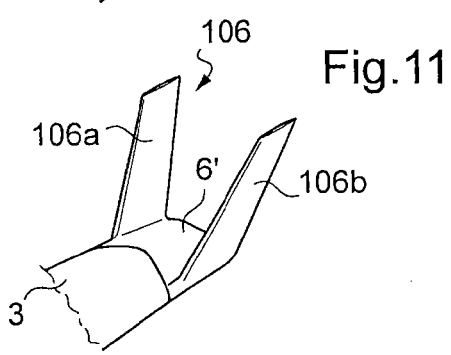

In an eleventh embodiment shown on FIG. 11, vertical stabilizer 106 consists of two vertical aerodynamic surfaces 106a and 106b being situated on both sides of support surface 6. There is no horizontal stabilizer.

The invention claimed is:

1. An aircraft, comprising:
    a fuselage extending along a longitudinal axis, the said fuselage comprising a central portion and a rear portion;
    wherein the central portion is separated from the rear portion by a bulkhead,
    wherein the rear portion includes at least one support surface including a rear end of the fuselage, the support surface bearing at least one stabilizer including at least a horizontal stabilizer and a substantially vertical stabilizer,
    wherein said support surface and the at least one stabilizer pivot in relation to the central portion around at least one axis of the aircraft, said at least one axis including a pitch axis,
    wherein the at least one stabilizer or the support surface is equipped with at least one control surface,
    wherein the rear portion includes a fixed portion and a moveable portion that includes the support surface including the rear end, the horizontal stabilizer and the substantially vertical stabilizer,
    wherein the fixed portion remains fixed in relation to the central portion when the moveable portion pivots, wherein activation means to pivot the moveable portion are provided between the bulkhead and the support surface,
wherein the fixed portion includes a first rib rearward of the bulkhead, the moveable portion includes a second rib onto which the support surface is mounted, and the activation means is between the first and the second rib.

2. The aircraft according to claim 1, wherein the support surface is integral with a pivot base section the normal of which, in a cruising position, is merged with the longitudinal axis of the fuselage, and in a different position, forms a positive or negative angle with the longitudinal axis.

3. The aircraft according to claim 1, wherein the at least one stabilizer includes two horizontal stabilizers on opposite ends of the support surface and two vertical stabilizers situated at an end of the respective horizontal stabilizers, and
wherein the vertical stabilizers each include an aerodynamic surface so that an assembly formed by the support surface, the horizontal stabilizers, and the vertical stabilizers is U-shaped.

4. The aircraft according to claim 1, wherein the horizontal stabilizer includes two aerodynamic surfaces forming a non-zero angle in relation to a horizontal plane.

5. The aircraft according to claim 1, wherein the horizontal stabilizer has a positive sweep.

6. The aircraft according to claim 1, wherein the horizontal stabilizer has a negative sweep.

7. The aircraft according to claim 1, wherein a second vertical stabilizer is fastened to the central portion of the fuselage.

8. The aircraft according to claim 1, wherein the support surface pivots with the aid of at least one jointed system around the pitch axis, the motion being induced by the activation means.

9. The aircraft according to claim 8, wherein the activation means are one or more linear or rotary actuators.

10. The aircraft according to claim 9, wherein the support surface pivots with the aid of at least two jointed systems around the pitch axis activated by the at least one actuator.

11. The aircraft according to one of claims 1, 2, and 3 to 10, wherein the central portion of the fuselage is substantially cylindrical and a section of the rear portion, starting from the bulkhead, is diminishing in height so that the support surface has a thickness that decreases gradually to a trailing edge of the support surface, thus imparting a substantially horizontal flattened shape to the support surface.

* * * * *